US010830142B2

(12) United States Patent
DiCintio et al.

(10) Patent No.: US 10,830,142 B2
(45) Date of Patent: Nov. 10, 2020

(54) COMBUSTOR AFT FRAME COOLING

(71) Applicant: General Electric Company, Schenectady, NY (US)

(72) Inventors: Richard Martin DiCintio, Simpsonville, SC (US); Srikanth Chandrudu Kottilingam, Greenville, SC (US)

(73) Assignee: General Electric Company, Schenectady, NY (US)

(*) Notice: Subject to any disclaimer, the term of this patent is extended or adjusted under 35 U.S.C. 154(b) by 878 days.

(21) Appl. No.: 15/289,247

(22) Filed: Oct. 10, 2016

(65) Prior Publication Data
US 2018/0100436 A1 Apr. 12, 2018

(51) Int. Cl.
F02C 7/12 (2006.01)
F01D 9/02 (2006.01)
F23R 3/00 (2006.01)

(52) U.S. Cl.
CPC ............ F02C 7/12 (2013.01); F01D 9/023 (2013.01); F23R 3/002 (2013.01); F05D 2220/32 (2013.01); F05D 2240/35 (2013.01); F05D 2250/185 (2013.01); F05D 2260/204 (2013.01); F05D 2260/205 (2013.01); F05D 2260/99 (2013.01)

(58) Field of Classification Search
CPC .. F01D 9/023; F01D 9/23; F23R 2900/03043; F23R 3/02; F23R 3/04; F23R 3/002; F23R 3/60; F05D 2260/20; F05D 2230/54; F05D 2230/22; F05D 2240/35; F05D 2260/204; F02C 7/12
See application file for complete search history.

(56) References Cited

U.S. PATENT DOCUMENTS

| 5,906,093 A * | 5/1999 | Coslow | F23R 3/005 60/39.37 |
| 6,412,268 B1 * | 7/2002 | Cromer | F01D 9/023 60/760 |
| 7,900,458 B2 * | 3/2011 | James | B23P 15/04 415/115 |

(Continued)

FOREIGN PATENT DOCUMENTS

| EP | 2 679 774 A1 | 1/2014 |
| EP | 2 730 748 A2 | 5/2014 |
| WO | 2016/094035 A1 | 6/2016 |

OTHER PUBLICATIONS

Extended European Search Report and Opinion issued in connection with corresponding EP Application No. 17194643.7 dated Jan. 26, 2018.

Primary Examiner — Todd E Manahan
Assistant Examiner — Thuyhang N Nguyen
(74) Attorney, Agent, or Firm — Dority & Manning, P.A.

(57) ABSTRACT

An aft frame for a duct of a combustor includes a rail or radial projection that extends circumferentially around the aft frame and that defines an outer surface of the aft frame. A preformed cover plate having an inner surface is attached to the outer surface of the aft frame. A plurality of micro-cooling channels is formed within at least one of the inner surface of the preformed cover plate and the outer surface of the aft frame. The preformed cover plate extends across the plurality of micro-cooling channels.

32 Claims, 5 Drawing Sheets

(56) References Cited

U.S. PATENT DOCUMENTS

| | | | |
|---|---|---|---|
| 8,245,515 B2* | 8/2012 | Davis, Jr. | F01D 9/023 |
| | | | 415/144 |
| 8,769,957 B2* | 7/2014 | Hada | F23R 3/002 |
| | | | 60/752 |
| 9,015,944 B2 | 4/2015 | Lacy et al. | |
| 9,243,508 B2* | 1/2016 | Morgan | F01D 9/023 |
| 9,255,484 B2* | 2/2016 | Cihlar | F01D 25/12 |
| 9,915,428 B2* | 3/2018 | Kishida | F23R 3/002 |
| 2013/0045452 A1 | 2/2013 | Costa et al. | |
| 2014/0170433 A1 | 6/2014 | Schick et al. | |
| 2014/0237784 A1 | 8/2014 | Lacy et al. | |
| 2015/0082795 A1 | 3/2015 | Fadde et al. | |
| 2015/0107262 A1* | 4/2015 | Maurer | F23R 3/42 |
| | | | 60/785 |
| 2015/0369068 A1 | 12/2015 | Kottilingam et al. | |
| 2015/0377037 A1 | 12/2015 | Salm et al. | |
| 2017/0292389 A1* | 10/2017 | Lorstad | F01D 25/12 |

* cited by examiner

US 10,830,142 B2

COMBUSTOR AFT FRAME COOLING

FIELD OF THE TECHNOLOGY

The present invention generally involves an igniter for a combustor. More specifically, the invention relates to a combustor having an aft frame where the aft frame includes micro-channels for cooling.

BACKGROUND

During operation of a gas turbine engine, pressurized air from a compressor flows into a head end volume defined within the combustor. The pressurized air flows from the head end volume into an inlet to a corresponding premix passage of a respective fuel nozzle. Fuel is injected into the flow of pressurized air within the premix passage where it mixes with the pressurized air so as to provide a fuel and air mixture to a combustion zone or chamber defined downstream from the fuel nozzle. The fuel and air mixture is burned in the combustion chamber to produce high temperature and high velocity combustion gases.

The combustion gases travel from the combustion chamber to an inlet of a turbine portion of the gas turbine engine via a liner or duct that extends at least partially between the combustion chamber and the turbine inlet. An aft frame is typically mounted to or formed at a downstream end of the duct. The aft frame may be used to reinforce the shape of the aft end of the duct and/or for mounting the duct to a support structure such as a compressor discharge casing. As such, the igniter housing may be subject to an operational temperature that may cause the igniter lead to deteriorate over time. Therefore, improved cooling of the igniter housing may improve performance of the igniter.

BRIEF DESCRIPTION OF THE TECHNOLOGY

Aspects and advantages are set forth below in the following description, or may be obvious from the description, or may be learned through practice.

One embodiment of the present disclosure is directed to an aft frame for a combustor. The aft frame includes a rail that extends circumferentially around the aft frame. The rail defines an outer surface of the aft frame. A preformed cover plate having an inner surface is attached to the outer surface of the aft frame. A plurality of micro-cooling channels is formed within at least one of the inner surface of the preformed cover plate and the outer surface of the aft frame. The preformed cover plate extends across the plurality of micro-cooling channels.

Another embodiment of the present disclosure is a combustor. The combustor includes a duct having an aft end, an annular flow passage surrounding the duct and an aft frame. The aft frame is disposed at the aft end of the duct and includes a rail that extends circumferentially around the aft end of the duct. The rail defines an outer surface of the aft frame. A preformed cover plate includes an inner surface that is attached to the outer surface of the aft frame. A plurality of micro-cooling channels is formed within at least one of the inner surface of the preformed cover plate and the outer surface of the aft frame. The preformed cover plate extends across the plurality of micro-cooling channels.

Those of ordinary skill in the art will better appreciate the features and aspects of such embodiments, and others, upon review of the specification.

BRIEF DESCRIPTION OF THE DRAWINGS

A full and enabling disclosure of the of various embodiments, including the best mode thereof to one skilled in the art, is set forth more particularly in the remainder of the specification, including reference to the accompanying figures, in which.

DETAILED DESCRIPTION

Figure 1:
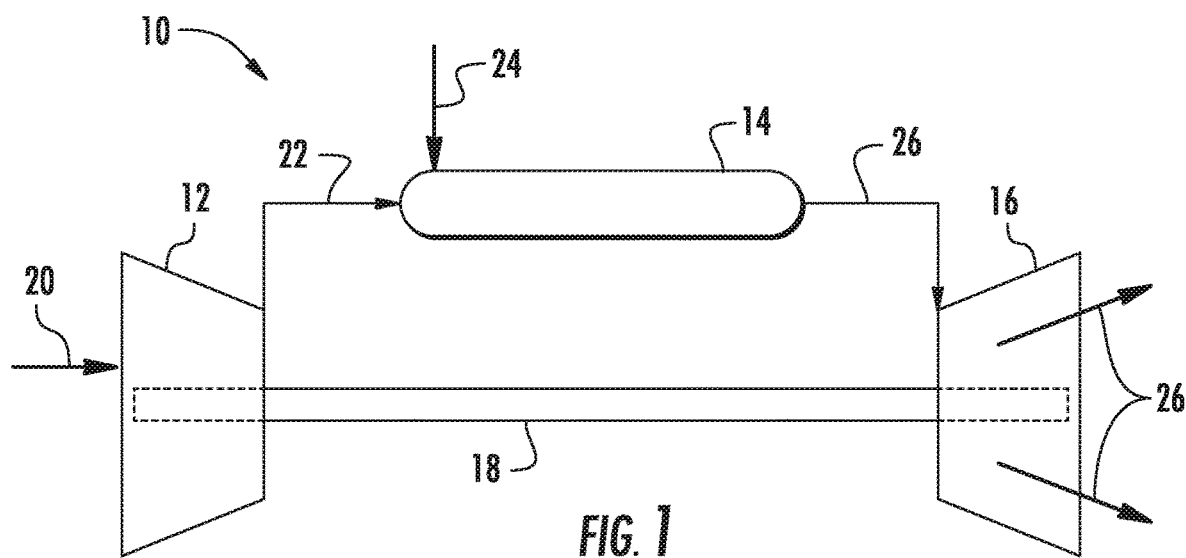
FIG. 1 is a functional block diagram of an exemplary gas turbine that may incorporate various embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. Although exemplary embodiments of the present disclosure will be described generally in the context of an aft frame for a combustor of a land based power generating gas turbine for purposes of illustration, one of ordinary skill in the art will readily appreciate that embodiments of the present disclosure may be applied to any style or type of combustor for a turbomachine and are not limited to combustors or combustion systems for land based power generating gas turbines unless specifically recited in the claims.

Referring now to the drawings, FIG. 1 illustrates a schematic diagram of an exemplary gas turbine 10. The gas turbine 10 generally includes a compressor 12, at least one combustor 14 disposed downstream of the compressor 12 and a turbine 16 disposed downstream of the combustor 14. Additionally, the gas turbine 10 may include one or more shafts 18 that couple the compressor 12 to the turbine 16.

During operation, air 20 flows into the compressor 12 where the air 20 is progressively compressed, thus providing compressed or pressurized air 22 to the combustor 14. At least a portion of the compressed air 22 is mixed with a fuel 24 within the combustor 14 and burned to produce combustion gases 26. The combustion gases 26 flow from the combustor 14 into the turbine 16, wherein energy (kinetic and/or thermal) is transferred from the combustion gases 26 to rotor blades (not shown), thus causing shaft 18 to rotate. The mechanical rotational energy may then be used for various purposes such as to power the compressor 12 and/or to generate electricity. The combustion gases 26 may then be exhausted from the turbine 16.

Figure 2:
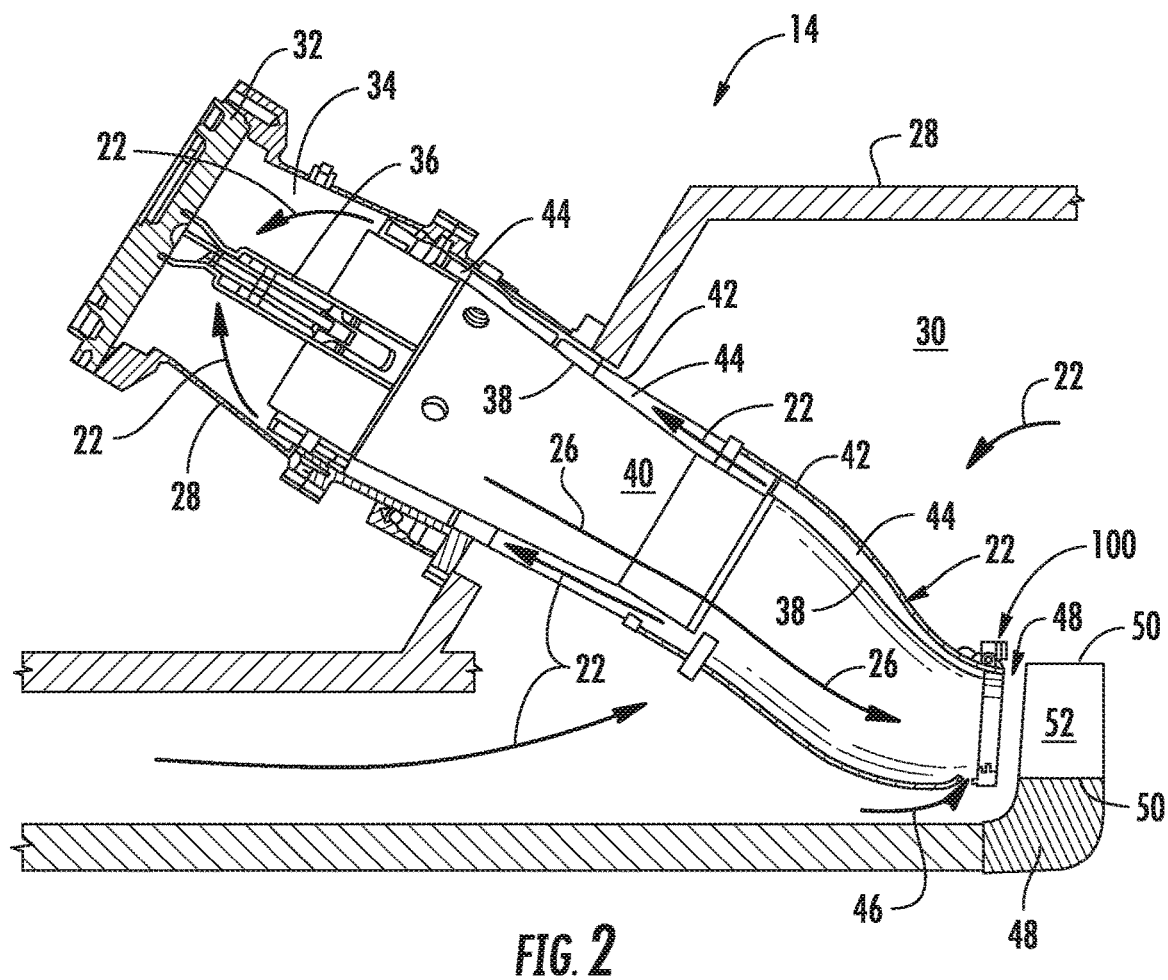
FIG. 2 is a cross sectional side view of an exemplary combustor 14 as may incorporate various embodiments of the present disclosure.

FIG. 2 is a cross sectional side view of an exemplary combustor 14 as may incorporate various embodiments of the present disclosure. As shown in FIG. 2, the combustor 14 may include an outer casing or compressor discharge casing 28 that at least partially forms a high pressure plenum 30 around various combustion hardware components. The high pressure plenum 30 is pressurized with a portion of the compressed air 22 from the compressor 12. The combustor 14 may also include an end cover 32 that is coupled to the outer casing 28. The end cover 32 and the outer casing 28 may at least partially define a head end volume 34 of the combustor 14. The head end volume 34 is in fluid communication with the high pressure plenum 30. At least one fuel nozzle 36 extends axially downstream from the end cover 32 and is in fluid communication with the head end volume 34.

A duct 38 extends downstream from the at least one fuel nozzle 36. The duct 38 may at least partially define a hot gas path 40 for routing the combustion gases 26 through the combustor 14 to an inlet 42 of the turbine 16. In particular embodiments, the duct 38 may be formed from a continuous or singular body. In other embodiments, the duct 38 may be formed from multiple ducts coupled together. A sleeve 42 such as a flow sleeve and/or an impingement sleeve may surround the duct 38 and form an annular flow passage 44 therebetween. The annular flow passage 44 may provide a flow path for routing the compressed air 22 from the high pressure plenum 30 into the head end volume 34. In various embodiments, an aft frame 100 is connected to or formed as a part of an aft or downstream end 46 of the duct 38. The aft frame 100 may provide structural support for maintaining the shape of the aft end 46 of the duct 38 and/or may provide mounting support for securing the duct 38 to a stationary component such as the outer casing 28, a nozzle mounting ring or the like. When installed in the combustor 14, an axial gap 48 is formed between the aft frame 100 and shroud portions 50 of a first stage stationary nozzle 52 disposed at an inlet to the turbine 16.

Figure 3:
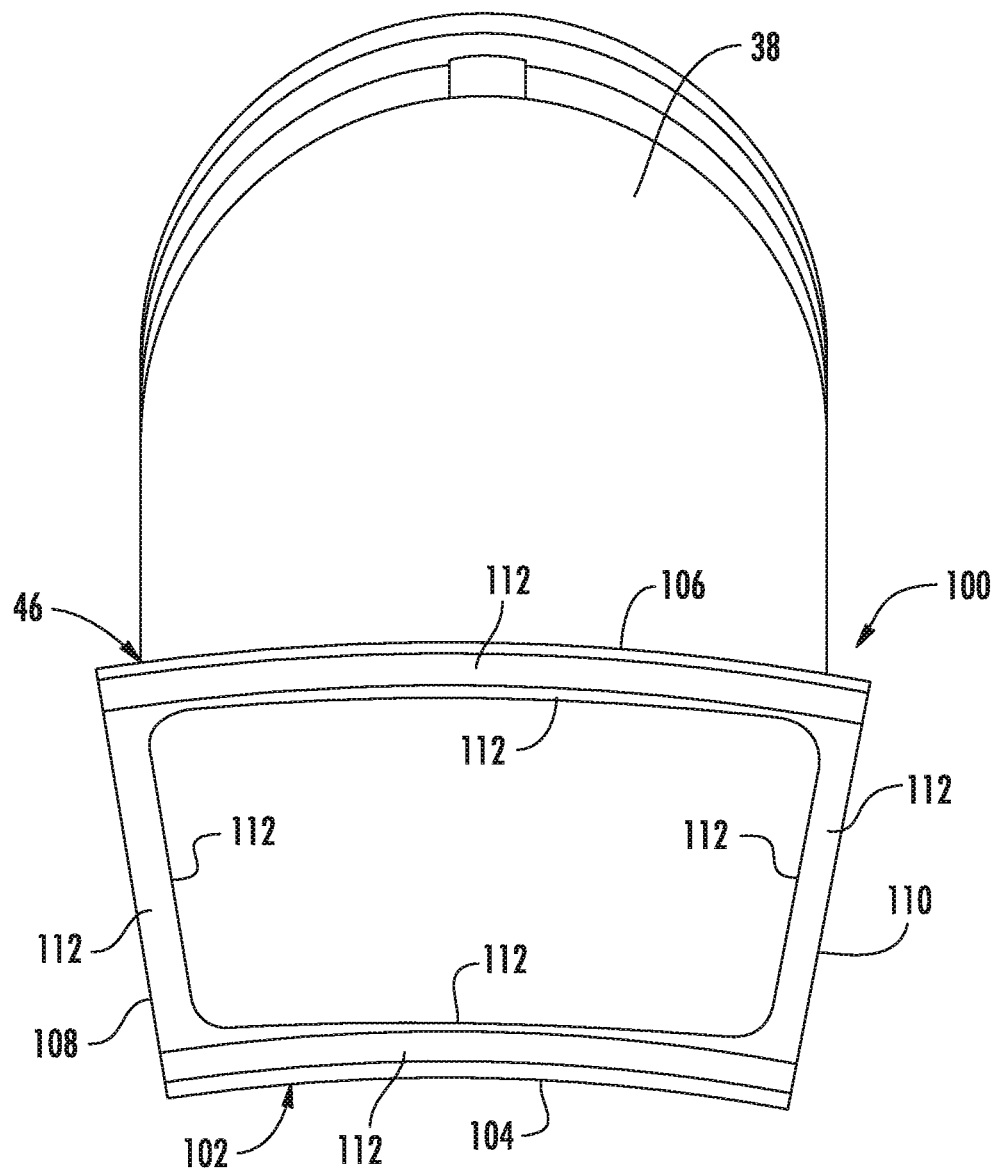
FIG. 3 is an upstream view of an exemplary aft frame coupled to an exemplary duct according to various embodiments of the present disclosure.

FIG. 3 provides an upstream view of an exemplary aft frame 100 coupled to an exemplary duct 38 according to various embodiments of the present disclosure. As shown in FIG. 3, the aft frame 100 generally includes a rail or radial projection 102 that extends circumferentially around and radially outwardly from the aft end of the duct 38. The rail 102 may be formed as an inner rail 104 having an arcuate shape, an outer rail 106 radially spaced from the inner rail 102 and also having an arcuate shape complementary to the inner rail 104. The rail 102 may further include a first side rail 108 that extends radially between the inner rail 104 and the outer rail 106, and a second side rail 110 circumferentially spaced from the first side rail 108 and that extends radially between the inner rail 104 and the outer rail 106. The rail 102 including the inner rail 104, the outer rail 106, the first side rail 108 and the second side rail 110 collectively define an outer surface or face 112 of the aft frame 100 and/or the duct 38.

Figure 4:
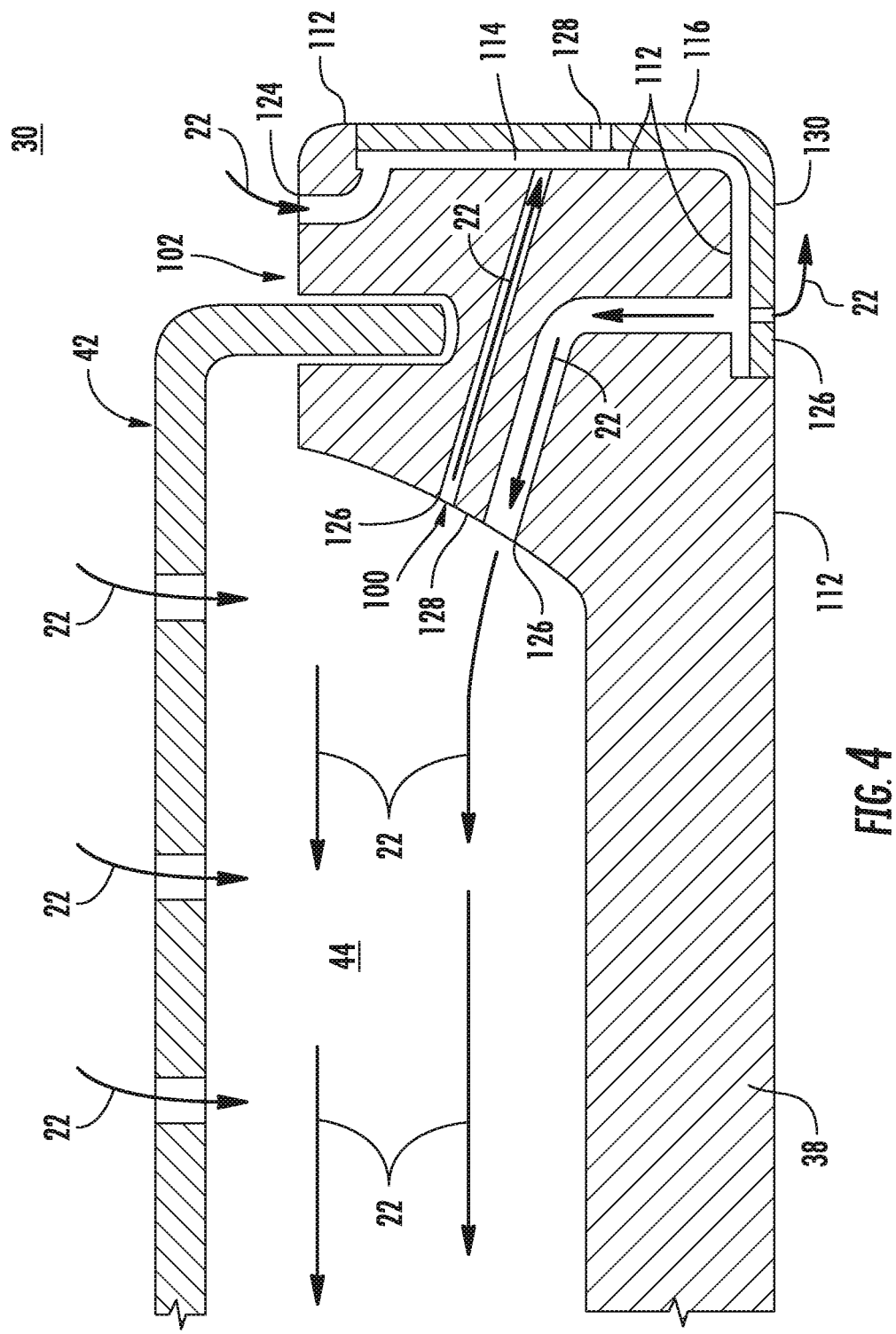
FIG. 4 is a cross sectional side view of an exemplary aft frame rail which is intended to be illustrative of one or more of an inner rail, an outer rail, a first side rail and/or a second side rail of the aft frame rail according to at least one embodiment of the present disclosure.

During operation of the combustor 14, a combustion gas recirculation zone may develop proximate to the axial gap 48 (FIG. 2), just downstream from the outer surface 112 of the aft frame 100. As a result, the aft frame 100 may be exposed to undesirable thermal stresses and thus, must be effectively cooled. FIG. 4 provides a cross sectional side view of an exemplary aft frame rail 102 which is intended to be illustrative of one or more of the inner rail 104, the outer rail 106, the first side rail 108 and the second side rail 110 according to at least one embodiment of the present disclosure. In various embodiments, as shown in FIG. 4, the rail 102 includes one or more micro-cooling channels 114 and one or more preformed cover plates 116 which cover and in at least one embodiment, at least partially define one or more of the plurality of micro-cooling channels 114.

Figure 5:
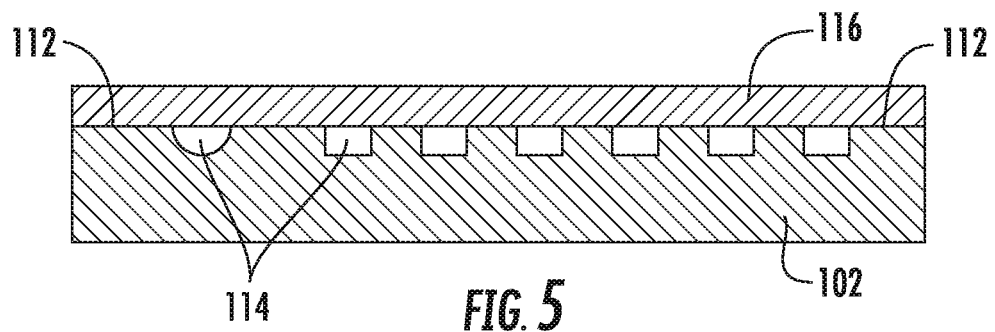
FIG. 5 is a cross sectioned view of a portion of an exemplary aft frame rail and a portion of an exemplary preformed cover plate according to at least one embodiment of the present disclosure.
Figure 6:
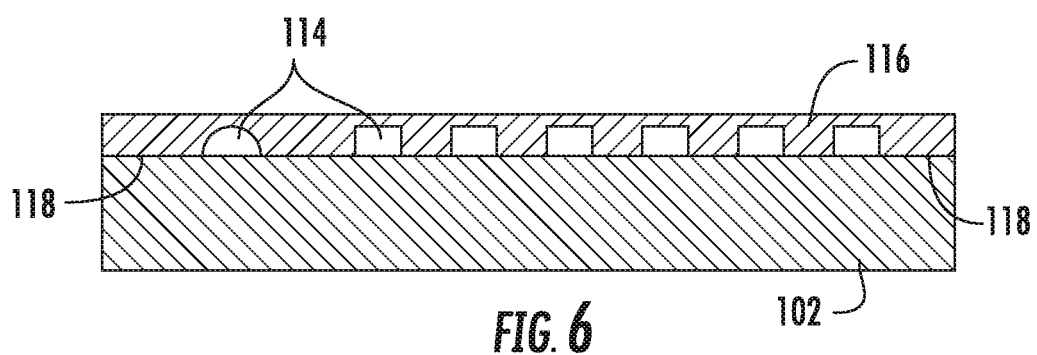
FIG. 6 is a cross sectioned view of a portion of an exemplary aft frame rail and a portion of an exemplary preformed cover plate according to at least one embodiment of the present disclosure.
Figure 7:
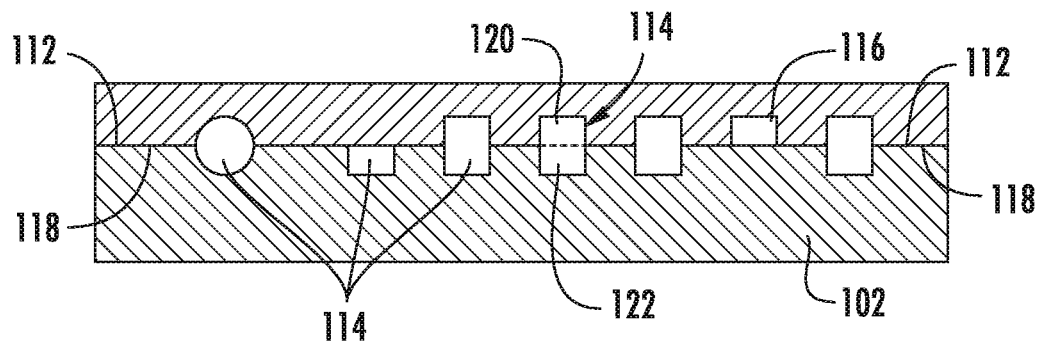
FIG. 7 is a cross sectioned view of a portion of an exemplary aft frame rail and a portion of an exemplary preformed cover plate according to at least one embodiment of the present disclosure.

FIG. 5 provides a cross sectioned view of a portion of an exemplary rail 102 and a portion of an exemplary preformed cover plate 116 according to at least one embodiment of the present disclosure. FIG. 6 provides a cross sectioned view of a portion of an exemplary rail 102 and a portion of an exemplary preformed cover plate 116 according to at least one embodiment of the present disclosure. FIG. 7 provides a cross sectioned view of a portion of an exemplary rail 102 and a portion of an exemplary preformed cover plate 116 according to at least one embodiment of the present disclosure.

In particular embodiments, as illustrated in FIGS. 4 and 5 collectively, the plurality of micro-cooling channels 114 may be defined in or formed along the outer surface 112 and/or the inner surface 114 of the aft frame 100. In particular embodiments, as shown in FIG. 6, the plurality of micro-cooling channels 114 may be defined in or formed along an inner surface 118 of the preformed cover plate(s) 116. In particular embodiments, as shown in FIG. 7, a first portion 120 of one or more micro-cooling channels 114 of the plurality of micro-cooling channels 114 may be defined in or formed along the inner surface 118 of the preformed cover plate(s) 116 and a second portion 122 of the one or more micro-cooling channels 114 may be defined in or formed along the outer surface 112 and/or the inner surface 114 of the aft frame 100.

Figure 8:
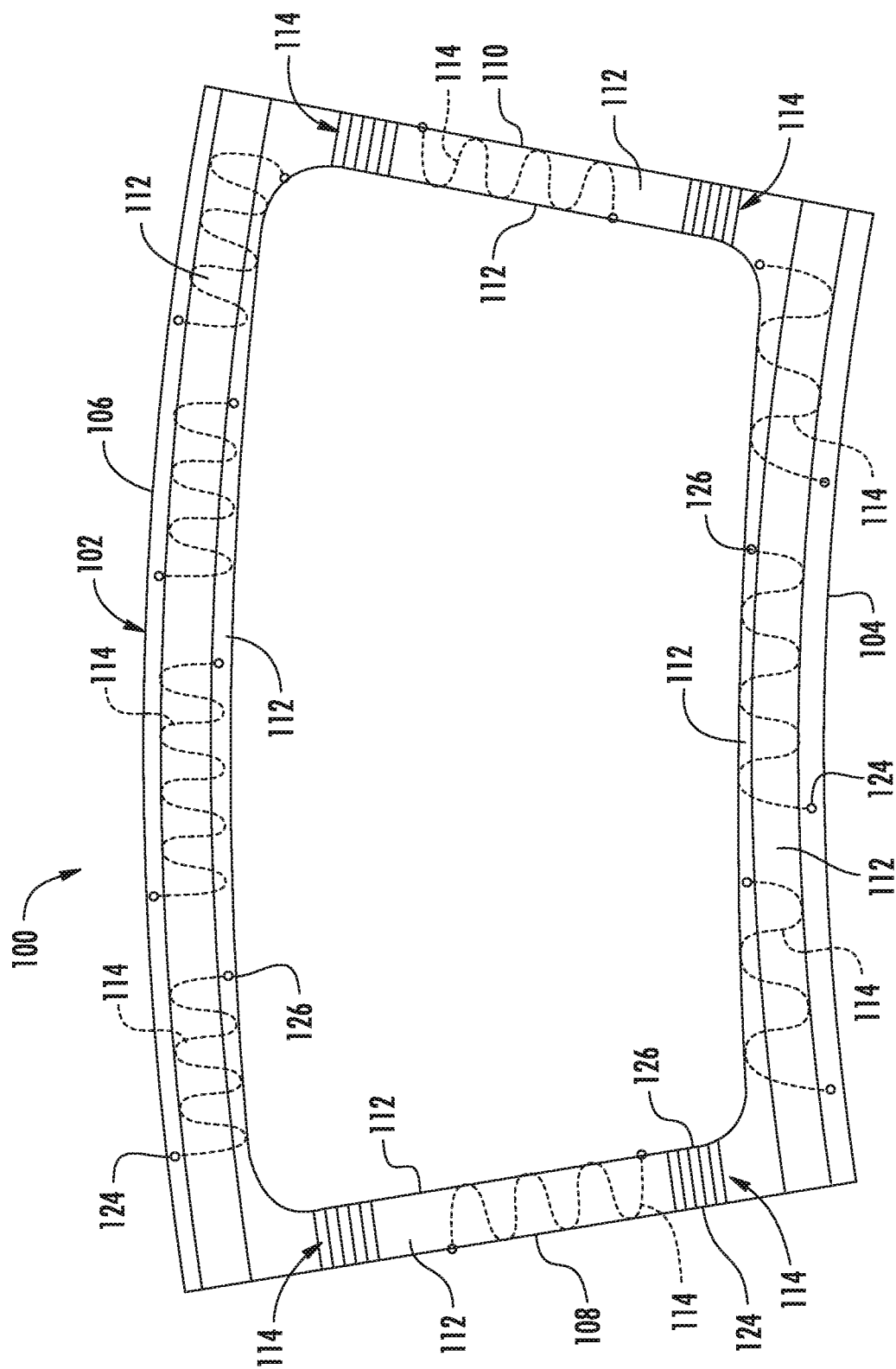
FIG. 8 is an enlarged upstream view of an exemplary aft frame according to various embodiments of the present disclosure.

FIG. 8 provides an enlarged upstream view of an exemplary aft frame 100 according to various embodiments of the present disclosure. In various embodiments, as shown in FIGS. 4 and 8 collectively, each micro-cooling channel 114 is in fluid communication with a respective channel inlet 124 and a respective channel outlet 126. In particular embodiments, the channel inlet(s) 124 are in fluid communication with the high pressure plenum 30. In particular embodiments, at least one channel inlet 124 may be defined along a backside surface 128 of the rail 102 and/or the aft frame 100 and may be in fluid communication with the annular flow passage 44. In particular embodiments, one or more channel outlets 126 are disposed and/or are in fluid communication with the annular flow passage 44. In particular embodiments, one or more of the channel outlets 126 may be defined along a respective preformed cover plate 116 of the one or more preformed cover plates 116.

In various embodiments, as illustrated in FIG. 8, the outer surface 112 of the aft frame 100 includes at least one but typically a plurality of the micro-cooling channels 114. The plurality of micro-cooling channels 114 may be formed in one or more of the inner rail 104, the outer rail 106, the first side rail 108 and/or the second side rail 110. The plurality of micro-cooling channels 114 may be the same or different in size or shape from each other. For example, in particular embodiments, one or more micro-cooling channels 114 of the plurality of micro-cooling channels 114 extends in a serpentine pattern. In particular embodiments, one or more micro-cooling channels 114 of the plurality of micro-cooling channels 114 extends in a substantially linear manner. In particular embodiments, the one or more micro-cooling channels 114 of the plurality of micro-cooling channels 114 extends in a serpentine pattern and one or more micro-cooling channels 114 of the plurality of micro-cooling channels 114 extends in a substantially linear manner.

In accordance with certain embodiments, the plurality of micro-cooling channels 114 may have a width of between about 100 microns (μm) and about 3 millimeters (mm) and a depth between about 100 μm and about 3 mm, as will be discussed below. For example, the plurality of micro-cooling channels 114 may have a width and/or depth between about 150 μm and about 1.5 mm, between about 250 μm and about 1.25 mm, or between about 300 μm and about 1 mm.

In certain embodiments, the plurality of micro-cooling channels 114 may have a width and/or depth of less than about 50, 100, 150, 200, 250, 300, 350, 400, 450, 500, 600, 700, or 750 μm. The plurality of micro-cooling channels 114 may have circular, semi-circular, oval, curved, rectangular, triangular, or rhomboidal cross-sections. The preceding list is merely illustrative and is not intended to be exhaustive. The width and depth could vary throughout its length. Additionally, in certain embodiments, the plurality of micro-cooling channels 114 may have varying cross-sectional areas. Heat transfer enhancements such as turbulators or dimples may be installed in the plurality of micro-cooling channels 114 as well.

In particular embodiments, as shown in FIGS. 4 through 7 collectively, the preformed cover plate(s) 116 is disposed over a portion of the outer surface 112 and/or the inner surface 114 of the aft frame 100, and more specifically over the plurality of micro-cooling channels 114 to at least partially enclose the plurality of micro-cooling channels 114 therebetween. The preformed cover plate 116 is shaped in such a way to form a flush engagement with the outer surface 112 and/or the inner surface 114 of the aft frame 100. A flush engagement provides effective sealing and enclosure of the plurality of micro-cooling channels 114. It is contemplated that the plurality of micro-cooling channels 114 is formed in the preformed cover plate 116 as an alternative to, or in combination with, micro-cooling channels formed in the outer surface 112 and/or the inner surface 114 of the aft frame 100.

The preformed cover plate 116 may be formed of various suitable materials. In one embodiment, the preformed cover plate 116 comprises a pre-sintered preform (PSP). In another embodiment, the preformed cover plate 116 comprises one or more layers of sheet metal. It is further contemplated that the preformed cover plate 116 may be formed of both PSP foil(s) and one or more layers of sheet metal.

The pre-sintered preform may comprise a mixture of particles comprising a base alloy and a second alloy that have been sintered together at a temperature below their melting points to form an agglomerate and somewhat porous mass. Suitable particle size ranges for the powder particles include 150 mesh, or even 325 mesh or smaller to promote rapid sintering of the particles and minimize porosity in the pre-sintered preform to about 10 volume percent or less. In some embodiments, the density of the pre-sintered preform has a density of 90% or better. In even some embodiments, the pre-sintered preform has a density of 95% or better. As discussed below, the pre-sintered perform can be subjected to hot isostatic pressing (HIP) or vacuum/inert atmosphere pressing to promote higher densities.

The base alloy of the pre-sintered preform can comprise any composition such as one similar to the aft frame 100 to promote common physical properties between the pre-sintered preform and the aft frame 100. For example, in some embodiments, the base alloy and the aft frame 100 share a common composition (i.e., they are the same type of material). In some embodiments, the base alloy can comprise nickel-based superalloys such as Rene N4, Rene N5, Rene 108, GTD-111®, GTD-222®, GTD-444®, IN-738 and MarM 247 or cobalt-based superalloys such as FSX-414 as discussed above. In some embodiments, the properties for the base alloy include chemical and metallurgical compatibility with the base article, such as high fatigue strength, low tendency for cracking, oxidation resistance and/or machinability.

In some embodiments, the base alloy may comprise a melting point of within about 25° C. of the melting temperature of the aft frame 100. In some embodiments, the base alloy may comprise a compositional range of, by weight, about 2.5 to 11% cobalt, 7 to 9% chromium, 3.5 to 11% tungsten, 4.5 to 8% aluminum, 2.5 to 6% tantalum, 0.02 to 1.2% titanium, 0.1 to 1.8% hafnium, 0.1 to 0.8% molybdenum, 0.01 to 0.17% carbon, up to 0.08% zirconium, up to 0.60 silicon, up to 2.0 rhenium, the balance nickel and incidental impurities. In even some embodiments, the base alloy may comprise a compositional range of, by weight, about 9 to 11% cobalt, 8 to 8.8% chromium, 9.5 to 10.5% tungsten, 5.3 to 5.7% aluminum, 2.8 to 2.3% tantalum, 0.9 to 1.2% titanium, 1.2 to 1.6% hafnium, 0.5 to 0.8% molybdenum, 0.13 to 0.17% carbon, 0.03 to 0.08% zirconium, the balance nickel and incidental impurities. It should be appreciated that while specific materials and compositions have been listed herein for the composition of the base alloy of the pre-sintered preform, these listed materials and compositions are exemplary only and non-limiting and other alloys may alternatively or additionally be used. Furthermore, it should be appreciated that the particular composition of the base alloy for the pre-sintered preform may depend on the composition of the aft frame 100.

As discussed above, the pre-sintered preform further comprises a second alloy. The second alloy may also have a composition similar to the aft frame 100 but further contain a melting point depressant to promote sintering of the base alloy and the second alloy particles and enable bonding of the pre-sintered preform to the aft frame 100 at temperatures below the melting point of the aft frame 100. For example, in some embodiments the melting point depressant can comprise boron and/or silicon.

In some embodiments, the second alloy may comprise a melting point of about 25° C. to about 50° C. below the grain growth or incipient melting temperature of the aft frame 100. Such embodiments may better preserve the desired microstructure of the aft frame 100 during the heating process. In some embodiments, the second alloy may comprise a compositional range of, by weight, about 9 to 10% cobalt, 11 to 16% chromium, 3 to 4% aluminum, 2.25 to 2.75% tantalum, 1.5 to 3.0% boron, up to 5% silicon, up to 1.0% yttrium, the balance nickel and incidental impurities. For example, in some embodiments the second alloy may comprise commercially available Amdry DF4B nickel brazing alloy. It should also be appreciated that while specific materials and compositions have been listed herein for the composition of the second alloy of the pre-sintered preform, these listed materials and compositions are exemplary only and non-limiting and other alloys may alternatively or additionally be used. Furthermore, it should be appreciated that the particular composition of the second alloy for the pre-sintered preform may depend on the composition of the aft frame 100.

The pre-sintered preform can comprise any relative amounts of the base alloy and the second alloy that are sufficient to provide enough melting point depressant to ensure wetting and bonding (e.g., diffusion/brazing bonding) of the particles of the base alloy and the second alloy to each other and to the outer surface 26 of the aft frame 100. For example, in some embodiments the second alloy can comprise at least about 10 weight percent of the pre-sintered preform. In some embodiments the second alloy can comprise no more than 70 weight percent of the pre-sintered preform. Such embodiments may provide a sufficient amount of melting point depressant while limiting potential reduction of the mechanical and environmental properties of the subsequent heating. Furthermore, in these embodiments, the base alloy can comprise the remainder of the pre-sintered preform (e.g., between about 30 weight percent and about 70 weight percent of the pre-sintered preform). In even some embodiments, the particles of the base alloy can comprise about 40 weight percent to about 70 weight percent of the pre-sintered preform with the balance of the composition comprising particles of the second alloy. It should be appreciated that while specific relative ranges of the base alloy and the second alloy have been presented herein, these ranges are exemplary only and non-limiting and any other relative compositions may also be realized such that a sufficient amount of melting point depressant is provided as discussed above.

Aside from the particles of the base alloy and the second alloy, no other constituents may be required within the pre-sintered preform. However, in some embodiments, a binder may be initially blended with the particles of the base alloy and the second alloy to form a cohesive mass that can be more readily shaped prior to sintering. In such embodiments, the binder can include, for example, a binder commercially available under the name NICROBRAZ-S from the Wall Colmonoy Corporation. Other potentially suitable binders include NICROBRAZ 320, VITTA GEL from Vitta Corporation, and others including adhesives commercially available from Cotronics Corporation, all of which may volatilize cleanly during sintering.

In some embodiments, the pre-sintered preform may actually comprise a plurality of layers, each being attached to each other before or after being connected to the aft frame 100. In such embodiments, the plurality of layers may combine to form one or more micro-cooling channels 114 of the plurality of micro-cooling channels 114 or a single layer may comprise one or more micro-cooling channels 114 of the plurality of micro-cooling channels 114 while additional layers are present for additional protection of the aft frame 100. Such embodiments may also allow for specific thermal properties in different zones of the pre-sintered preform to be individually tailored. In even some embodiments, the pre-sintered preform may be combined with one or more metal layers or sections. For example, the pre-sintered preform may form the sides of the one or more micro-cooling channels 114 of the plurality of micro-cooling channels 114 while a thin metal film closes off the top of the respective micro-cooling channel 114. In such embodiments, the metal film may be bonded prior to, after or while the pre-sintered preform is bonded to the aft frame 100. Or, in some embodiments, the pre-sintered preform may bond with the aft frame 100 via one or more additional metal layers.

In operation, a cooling medium such as the compressed air 22 from the compressor 12, enters at least one channel inlet 124 of the one or more channel inlets 124 and flows through the plurality of micro-cooling channels 114 defined beneath the preformed cover plate 116 and/or through the plurality of micro-cooling channels 114 defined along the inner surface 118 of the preformed cover plate 116, thereby transferring thermal energy provided by the combustion gases 26 away from the aft frame 100 and/or the preformed cover plate 116. In particular embodiments, a portion or all of the cooling medium may be exhausted from the micro-cooling channels 114 into the annular flow passage 44 via one or more of the channel outlets 126 disposed within the annular flow passage 44 so that it may be mixed with the compressed air 22 flowing though the annular flow passage 4 upstream from the fuel nozzle 36, thereby increasing the compressed air flow to the head end volume 34 of the combustor 14. In particular embodiments, a portion or all of the cooling medium may be exhausted from the micro-cooling channels 114 via one or more of the channel outlets 126 defined along the preformed cover plate 116, thereby providing a film of cooling medium to an outer surface 130 (FIG. 4) of the preformed cover plate 116.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An aft frame disposed at an aft end of a duct for a combustor, the aft frame comprising:
   a rail extending circumferentially around the aft frame, the rail defining an outer surface of the aft frame, wherein the rail extends radially beyond the duct and away from an axial centerline of the combustor, and wherein the outer surface of the aft frame comprises a first axially extending portion and a first radially extending portion; and a preformed cover plate having an inner surface attached to the outer surface of the aft frame, the inner surface of the preformed cover plate comprising a second axially extending portion and a second radially extending portion, wherein the second axially extending portion is flush with the first axially extending portion, and wherein the second radially extending portion is flush with the first radially extending portion;

wherein a plurality of micro-cooling channels is formed within at least one of the inner surface of the preformed cover plate and the outer surface of the aft frame, each micro-cooling channel of the plurality of micro-cooling channels extending between a respective channel inlet of a plurality of channel inlets and a respective channel outlet of a plurality of channel outlets, each channel outlet defined in the preformed cover plate, whereby cooling medium exhausted from the plurality of channel outlets provides a film of cooling medium to an outer surface of the preformed cover plate, wherein the preformed cover plate extends across the plurality of micro-cooling channels.

2. The aft frame as in claim 1 wherein the plurality of micro-cooling channels is formed in the outer surface of the aft frame beneath the preformed cover plate.

3. The aft frame as in claim 1, wherein the plurality of micro-cooling channels is formed in the inner surface of the preformed cover plate.

4. The aft frame as in claim 1, wherein a portion of at least one micro-cooling channel of the plurality of micro-cooling channels is partially formed in the outer surface of the aft frame and is partially formed in the inner surface of the preformed cover plate.

5. The aft frame as in claim 1, wherein the preformed cover plate comprises a pre-sintered preform.

6. The aft frame as in claim 1, wherein the preformed cover plate comprises one or more layers of sheet metal.

7. The aft frame as in claim 1, wherein the preformed cover plate comprises a pre-sintered preform and one or more layers of sheet metal.

8. The aft frame as in claim 1, wherein the preformed cover plate is flush with the outer surface of the aft frame.

9. The aft frame as in claim 1, wherein one or more micro-cooling channels of the plurality of micro-cooling channels is formed in serpentine pattern.

10. The aft frame as in claim 1, wherein at least one channel inlet of the plurality of channel inlets is defined along the backside surface of the aft frame.

11. The aft frame as in claim 1, wherein at least one channel inlet of the plurality of channel inlets is defined along the outer surface of the aft frame.

12. The aft frame as in claim 1, wherein the rail includes an inner rail, an outer rail, a first side rail and a second side rail.

13. The aft frame as in claim 12, wherein one or more micro-cooling channels of the plurality of micro-cooling channels is disposed along the inner rail.

14. The aft frame as in claim 12, wherein one or more micro-cooling channels of the plurality of micro-cooling channels is disposed along the outer rail.

15. The aft frame as in claim 12, wherein one or more micro-cooling channels of the plurality of micro-cooling channels is disposed along the first side rail.

16. The aft frame as in claim 12, wherein one or more micro-cooling channels of the plurality of micro-cooling channels is disposed along the second side rail.

17. A combustor, comprising:
a duct having an aft end;
an annular flow passage surrounding the duct;
an aft frame disposed at the aft end of the duct, wherein the aft frame includes a rail extending circumferentially around the aft end of the duct, the rail defining an outer surface of the aft frame, wherein the rail extends radially beyond the duct and away from an axial centerline of the combustor, and wherein the outer surface of the aft frame comprises a first axially extending portion and a first radially extending portion; and
a preformed cover plate having an inner surface attached to the outer surface of the aft frame, the inner surface of the preformed cover plate comprising a second axially extending portion and a second radially extending portion, wherein the second axially extending portion is flush with the first axially extending portion, and wherein the second radially extending portion is flush with the first radially extending portion;
wherein a plurality of micro-cooling channels is formed within at least one of the inner surface of the preformed cover plate and the outer surface of the aft frame, each micro-cooling channel of the plurality of micro-cooling channels extending between a respective channel inlet of a plurality of channel inlets and a respective channel outlet of a plurality of channel outlets, each channel outlet defined in a backside surface of the aft frame and in direct fluid communication with the annular flow passage, whereby cooling medium exhausted from the plurality of channel outlets is mixed with compressed air flowing though the annular flow passage, wherein the preformed cover plate extends across the plurality of micro-cooling channels.

18. The combustor as in claim 17, wherein the plurality of micro-cooling channels is formed in the outer surface of the aft frame beneath the preformed cover plate.

19. The combustor as in claim 17, wherein the plurality of micro-cooling channels is formed in the inner surface of the preformed cover plate adjacent to the outer surface of the aft frame.

20. The combustor as in claim 17, wherein a first portion of at least one micro-cooling channel of the plurality of micro-cooling channels is formed in the outer surface of the aft frame and a second portion of the same micro-cooling channel is formed in the inner surface of the preformed cover plate.

21. The combustor as in claim 17, wherein the preformed cover plate comprises a pre-sintered preform.

22. The combustor as in claim 17, wherein the preformed cover plate comprises one or more layers of sheet metal.

23. The combustor as in claim 17, wherein the preformed cover plate comprises a pre-sintered preform and one or more layers of sheet metal.

24. The combustor as in claim 17, wherein the preformed cover plate is flush with the outer surface of the aft frame.

25. The combustor as in claim 17, wherein one or more micro-cooling channels of the plurality of micro-cooling channels is formed in serpentine pattern.

26. The combustor as in claim 17, wherein at least one channel inlet of the plurality of channel inlets is defined along the backside surface of the aft frame.

27. The combustor as in claim 17, wherein at least one channel inlet of the plurality of channel inlets is defined in the backside surface of the aft frame and is in fluid communication with the annular flow passage.

28. The combustor as in claim 17, wherein the rail includes an inner rail, an outer rail, a first side rail and a second side rail.

29. The combustor as in claim 28, wherein one or more micro-cooling channels of the plurality of micro-cooling channels is disposed along the inner rail.

30. The combustor as in claim 28, wherein one or more micro-cooling channels of the plurality of micro-cooling channels is disposed along the outer rail.

31. The combustor as in claim 28, wherein one or more micro-cooling channels of the plurality of micro-cooling channels is disposed along the first side rail.

32. The combustor as in claim 28, wherein one or more micro-cooling channels of the plurality of micro-cooling channels is disposed along the second side rail.

* * * * *